April 19, 1966   P. GALMICHE   3,246,395
METHODS OF BRAZING METALLIC PIECES TOGETHER
Filed Oct. 19, 1964   4 Sheets-Sheet 1
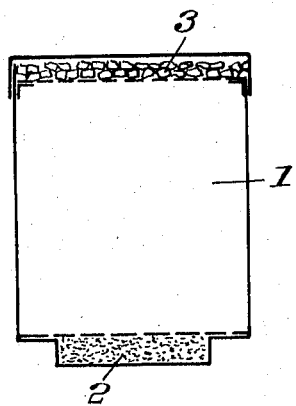
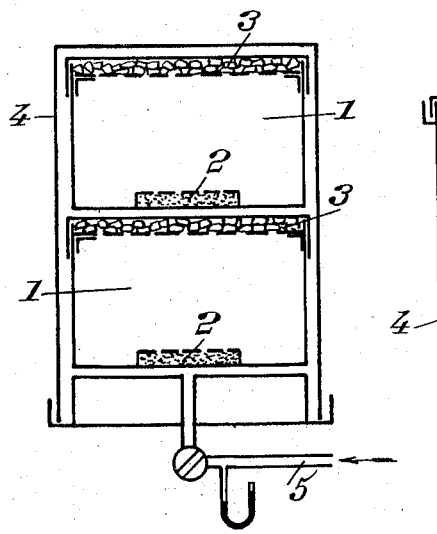
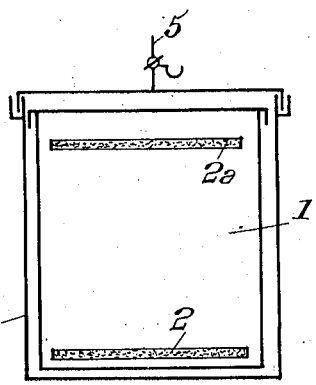

Copper (solder)
Chromium carbide
Graphite

Graphite
Chromium carbide
Solder
Stainless steel

← Graphite
← Chromium carbide
← Solder

← Tungsten

Pyrex glass →

Chromium carbide →

Graphite →

United States Patent Office

3,246,395
Patented Apr. 19, 1966

3,246,395
METHODS OF BRAZING METALLIC PIECES TOGETHER
Philippe Galmiche, 1 Rue Blaise Desgoffes, Paris, France
Filed Oct. 19, 1964, Ser. No. 404,979
Claims priority, application France, Apr. 13, 1959, 791,906
5 Claims. (Cl. 29—494)

This application is a continuation in part of my co-pending application S.N. 828,604, now abandoned, filed July 21, 1959 for Method of Treating Refractory Metallic Pieces, which application S.N. 828,604 was itself a continuation in part of abandoned applications S.N. 367,286 and S.N. 565,286 filed, respectively, on July 10, 1953 and February 13, 1956.

The present invention relates to the joining or uniting of pieces by means of a hard solder, such an operation being hereinafter called "brazing."

According to this invention, this brazing is performed in a deoxidizing atmosphere of hydrogen, hydrofluoric acid and a metallic fluoride which is little volatile and partly unstable in a hydrogen containing atmosphere under conditions corresponding to a balanced reduction of the halide by the hydrogen. Among the metallic fluorides which are suitable, I may cite fluorides of chromium, nickel, cobalt, iron, tungsten, possibly of molybdenum, or of several of them. Such an atmosphere has a deoxidizing power which is extremely strong, much stronger than that of the so-called reducing atmospheres used up to now. It may be obtained in a simple manner by heating, in a hydrogen medium, partly fluidtight boxes (that is to say boxes which permit limited interchanges between the hydrogen medium external to them and the inside thereof) in the bottom part of which has been placed, out of contact with the pieces to be brazed together, a small amount of a halide capable of being dissociated by heat, generally ammonium fluoride, and a metal in divided form, for instance chromium or ferro-chromium, nickel, or ferro-nickel, cobalt or ferro-cobalt, tungsten, possibly molybdenum and so on.

At the beginning of heating, ammonium fluoride is dissociated, forming a gaseous mixture of hydrogen, hydrofluoric acid and nitrogen, which drives out the air contained in the treatment box, owing to the fact that said box is only partly fluidtight, whereas a portion of this hydrofluoric acid forms, with the metal in divided form, a little volatile halide which can be gradually reduced by hydrogen at the temperature of treatment.

I may also make use of a mixture of ammonium fluoride, serving, as above, to drive out the air initially present in the treatment box, and of the metal fluoride that is chosen, for instance, among those above mentioned.

Above a temperature of about 700° C., the atmosphere in the treatment box contains, according to a balanced reaction, simultaneously hydrogen, hydrofluoric acid and the chosen metal fluoride, the proportions of said bodies in the atmosphere being automatically restored for a given temperature (at the pressure where the operation is conducted, which is generally, but not necessarily, little different from atmospheric pressure) in the case where it is modified by any circumstances.

Thus, if a small amount of hydrogen enters the treatment box, owing to the partial fluidtightness thereof, the amount of halide just necessary for restoring the balanced composition is automatically formed.

Likewise, if the relative proportion of hydrogen and hydrofluoric acid in this atmosphere undergoes a modification due, for instance, to the reduction, under their conjugated action, of a metallic oxide present on the pieces to be brazed together or on the brazing composition, with formation of water vapor and vapor of the halide of the metal of the oxide, the balanced composition is automatically restored.

This process is interfered with by the production of water vapor only when the water vapor partial pressure is a very high, contrary to what takes place in the case of reducing atmospheres consisting of hydrogen alone, where small partial pressures of water vapor stop or very strongly slow down the reduction of the oxides, which requires the continuous renewal of the atmosphere by a very high flow rate of hydrogen.

The fact of using a fluoride has, over the use of other halides, the following advantages:

First, contrary to other halides, it does not alter, at the brazing temperature, the metallic materials consisting chiefly of chromium, iron, nickel, cobalt, tungsten or alloys of these metals.

On the other hand, the fluorides formed during the treatment are not hygroscopic so that, contrary to what would take place with the other halides, which are hygroscopic, it is not necessary, after brazing, to clean the brazed pieces and no precaution is required for storing the treatment boxes between successive different brazing operations.

Chromium is particularly suitable as metal of the fluoride entering into the composition of the hydrogen and fluoride deoxidizing atmosphere but, as above stated, I may also use fluorides of cobalt, nickel, iron, ferro-chromium, tungsten and possibly molybdenum.

When the metal fluoride, relatively little volatile and reducible by hydrogen, entering into the composition of the very strongly deoxiding hydrogenated and fluorinated atmosphere consists of chromium fluoride, the brazing treatment is conducted in such manner that there is no substantial addition of chromium to the pieces that are brazed together.

For this purpose, I may, for instance, proceed as follows:

I may dose the amount of chromium fluoride in the treatment box to a very low value, of the order of magnitude of some decigrams (and at most 2 g.) per liter of free volume in the treatment box after charging thereof. I may also place, in said box, the chromium from which chromium fluoride may form at a distance from the pieces to be brazed greater than some centimeters, for instance, of the order of 5 cm. and preferably 10 cm. I may for instance keep said chromium at the suitable distance from the pieces by means of a metallic grid of suitable shape and position.

I may also interpose, between the pieces to be brazed and the chromium fluoride, a grid of a metal, such for instance as nickel, such that the vapors of chromium fluoride travelling toward the pieces, form, with the metal of the grid (nickel), a fluoride of said metal (nickel fluoride) while abandoning chromium on said grid. For instance the pieces to be brazed are placed in a container located inside the treatment box, the space inside said container communicating with the remainder of the box through a nickel grid, which for instance is the lid of said container. Alternately the pieces to be brazed are placed in a partly fluidtight container located inside the treatment box.

I may also place the ammonium fluoride and the chromium in finely divided state (or the chromium fluoride prepared in advance) in a box disposed inside the treatment box and having a lid constituted by a nickel grid.

According to a feature of my invention, in a method of joining together two pieces of respective materials selected from the group consisting of metals, alloys of metals, sintered mixtures of at least one metal and at least one refractory oxide, and metal carbides, by means of a hard solder capable in the fused state of joining said material pieces together, at least a portion of the surface of said solder containing at least 10% of chromium, I juxtapose said pieces in the relative position in which they are to be joined, I place said solder along the adjoining portions of said material pieces, and I heat the whole to a temperature higher than 700° C. in an atmosphere consisting essentially of hydrogen, hydrofluoric acid and a metallic fluoride which is little volatile and partly unstable in a hydrogen containing atmosphere, which atmosphere may further contain another hydrohalogenic acid and the corresponding metallic halide, under conditions corresponding to a balanced reduction of the fluoride, and possibly the other halide, by said hydrogen.

According to another feature of my invention, in a method of joining together two pieces, one of which is metallic and at least a portion of the surface of which contains at least 10 percent of chromium and the other of which is made of a material selected from the group consisting of metals, alloys of metals, sintered mixtures of at least one metal and at least one refractory oxide, and metal carbides, by means of a hard solder capable, in the fused state, of joining said material pieces together, I juxtapose said pieces in the relative position in which they are to be joined, I place said solder along the adjoining portions of said material pieces, and I heat the whole to a temperature higher than 700° C. in an atmosphere consisting essentially of hydrogen, hydrofluoric acid and a metallic fluoride which is little volatile and partly unstable in a hydrogen containing atmosphere, which atmosphere may further contain another hydrohalogenic acid and the corresponding metallic halide, under conditions corresponding to a balanced reduction of the fluoride, and possibly the other halide, by said hydrogen.

According to still another feature of my invention, in a method of joining together two pieces one of which is a sintered mixture of at least one metal and at least one refractory oxide and the other of which is made of a material selected from the group consisting of metals, alloys of metals, sintered mixtures of at least one metal and at least one refractory oxide, and metal carbides, by means of a hard solder capable, in the fused state, of joining said material pieces together, I juxtapose said pieces in the relative position in which they are to be joined, I place said solder along the adjoining portions of said material pieces, and I heat the whole to a temperature higher than 700° C. in an atmosphere consisting essentially of hydrogen, hydrofluoric acid and a metallic fluoride which is little volatile and partly unstable in a hydrogen containing atmosphere, which atmosphere may further contain another hydrohalogenic acid and the corresponding metallic halide, under conditions corresponding to a balanced reduction of the halide by said hydrogen.

According to still another feature of my invention, in a method of joining together two pieces one of which is a metal carbide and the other of which is made of a material selected from the group consisting of metals, alloys of metals, sintered mixtures of at least one metal and at least one refractory oxide, and metal carbides, by means of a hard solder capable, in the fused state, of joining said material pieces together, I juxtapose said pieces in the relative position in which they are to be joined, I place said solder along the adjoining portions of said material pieces, and I heat the whole to a temperature higher than 700° C. in an atmosphere consisting essentially of hydrogen, a hydrohalogenic acid and a corresponding metallic halide which is little volatile and partly unstable, in a hydrogen containing atmosphere, under conditions corresponding to a balanced reduction of the halide by said hydrogen.

Still another feature of my invention consists in a method which comprises placing a piece of a material of the group consisting of diamond, graphite and coke, in an atmosphere consisting essentially of hydrogen, hydrohalogenic acid and a corresponding metallic halide which is little volatile and partly unstable in a hydrogen containing atmosphere under conditions corresponding to a balanced reduction of the halide by said hydrogen, and heating the whole to a temperature higher than 700° C., whereby there is formed on said piece a layer of the carbide of the metal of the halide.

According to still another feature of my invention, in a method of joining together two pieces one of which is of a material of the group consisting of diamond, graphite and coke and the other of which is made of a material selected from the group consisting of metals, alloys of metals, sintered mixtures of at least one metal and at least one refractory oxide, and metal carbides, by means of a hard solder capable, in the fused state, of joining said material pieces together, I juxtapose said pieces in the relative position in which they are to be joined, I place said solder along the adjoining portions of said material pieces, and I heat the whole to a temperature higher than 700° C. in an atmosphere consisting essentially of hydrogen, a hydrohalogenic acid and a corresponding metallic halide which is little volatile and partly unstable in a hydrogen containing atmosphere, under conditions corresponding to a balanced reduction of the halide by said hydrogen, whereby there is formed, on the surface of the first mentioned piece, along the adjoining portions of the two pieces, a layer of the carbide of the metal of said halide, through which layer said first mentioned piece is joined to the other piece.

Preferred embodiments of the invention will be hereinafter described with reference to the appended drawings given merely by way of example and in which:

FIGS. 1 to 3 show three types of treatment boxes for applying the brazing method according to this invention;

Figure 4:
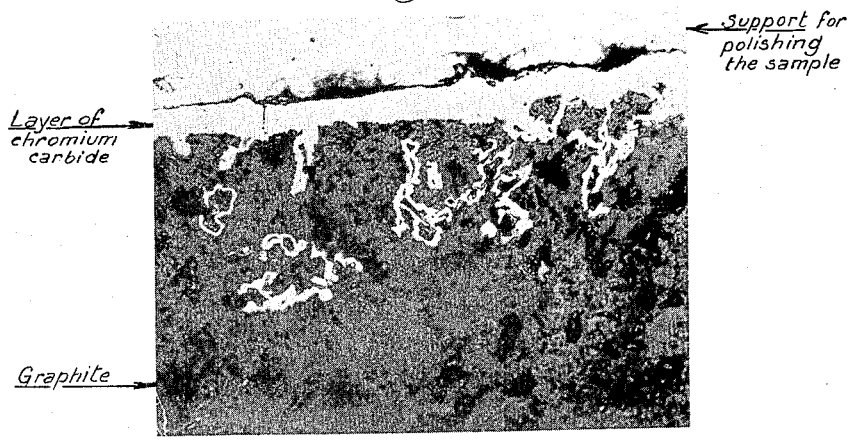
FIG. 4 is a microphotography of a piece of graphite with a chromized layer of chromium carbide anchored thereon.

In order to perform the brazing operation, the pieces, suitably juxtaposed together, are placed in partly fluid-tight boxes, such as shown by FIGS. 1 to 3, said boxes being heated in a reducing atmosphere (hydrogen, ammonia, either cracked or not) preferably at substantially normal pressure or possibly at a pressure higher than atmospheric pressure, such a heating being performed for instance in a resistance oven or in a high frequency oven.

The treament boxes as shown by the drawings include at least one chamber 1 in which the pieces to be brazed together are in the presence of but out of contact with, a cementation product 2 which is for instance advantageously constituted either by ammonium fluoride and chromium with the possible addition of hydrofluoric acid in solution or of other ammonium halides, or by ammonium fluoride and chromium fluoride prepared in advance. Chromium, which is preferably in the form of a powder or of grains, may be replaced by a ferro-chromium powder or by a mixture of nickel or manganese powder with chromium powder.

Advantageously, I place in the treatment boxes, preferably above the pieces to be brazed together, chromium 3 serving to regenerate the chromium fluoride vapors when this is required to restore the balanced reaction conditions.

Said chromium is advantageously held in the top portion of the box by means of a grid so that there is no substantial addition of chromium to the pieces brazed together. Said chromium is preferably located near the portions of the treatment boxes where some leakage can occur.

FIG. 1 shows a simple box and FIG. 2 two boxes superimposed on each other and placed in a partly fluidtight container 4 through which circulates hydrogen or ammonia fed through a conduit 5. This container 4 may be constituted by the inside of an oven.

When the treatment boxes are of large dimensions, it may be advantageous, in order quickly to eliminate the air present in said boxes at the beginning of the operation, to add water or a solution of ammonium carbonate to the cementation product 2.

As it will be explained in more detailed fashion in what follows, in some cases some amount of halides or halogens other than fluoride components may be either incorporated in the cementation product 2 or, preferably, placed in the treatment boxes near the leakage zone thereof.

The distance between the regeneration chromium and the pieces to be brazed together is chosen so that the metal halide vapors forming chiefly the atmosphere of the box cannot add any substantial amount of chromium on the surface of the pieces to be brazed together but only exerts a very high deoxidizing action.

When a treatment box made as above stated is heated, the cementation product gives off on the one hand sweeping gases (nitrogen, hydrogen and hydrofluoric acid) and on the other hand vapors of chromium fluoride. As above stated, there is thus produced in the box a state of equilibrium between the gaseous chemical products present therein.

Such atmospheres do not permit any oxide to remain in the atmosphere because any oxide as might exist is transformed into a fluoride which is gradually reduced by hydrogen allowed to penetrate into the box. Thus for instance, chromium, iron and nickel oxides will be eliminated.

The more stable fluorides (manganese, titanium, silicon and boron fluorides) are more volatile and are therefore eliminated without chemical transformation, but it is of interest, whenever there is a risk of formation of stable volatile halides, to limit as much as possible the amounts of products capable of producing such halides.

I will now specify in what cases and in which conditions halides or halogens other than fluorides or fluorines may be introduced into the treatment boxes.

It may happen that some of the metals in contact with the atmosphere in the treatment box, in particular metals entering into the composition of the solder are very much altered by hydrofluoric acid with which they form stable and volatile fluorides, whereas these metals are much less attacked by other hydrohalogenic acids. Therefore, it is advantageous to reduce the relative amount of fluorine containing substances in the cementation product and to complete the cementation product with another halogen or halide chosen for the desired purposes (bromine, ammonium bromide, iodine, chlorine, etc. . . .).

The different halides that are used may either be mixed together or kept separate from one another. In particular, the halides or halogens other than fluorides or fluorine may be incorporated to form a separate cementation product located closer to the leakage zones of the treatment boxes when it is desired to obtain a good state of surface of the pieces.

The amount of halogens other than fluorine depends upon the quality of surface that is desired for the pieces, the amount of fluorine being generally of at least 20% if it is desired to obtain the best possible scouring and quality of surface.

FIG. 3 shows a partly gastight treatment box for brazing pieces made of 18/8 chromium-nickel steel, the solder consisting of silver and maganese with 35% of manganese. The temperature of treatment is 1130° C.

Chamber 1 is located between a lower mixture consisting of ammonium fluoride and chromium powder and an upper mixture 2a containing iodine and iron powder.

When ammonium fluoride is the only halogen containing compound (1 g. per liter), the pieces that are obtained have a bright aspect and are tightly joined to the solder but the solder looses 10% of its manganese and small droplets of manganese fluoride are formed in the vicinity of the brazed zones. No substantial addition of chromium is found to occur on the surface of the pieces.

When use is made of two cementation products 2 and 2a as above referred to, with proportions of 75% of iodine (1.5 g. per liter) and 25% of ammonium fluoride (0.5 g. per liter), the brazing is also very good, the surfaces have a silvery appearance and are very slightly rough, there being still no substantial addition of chromium, the loss of manganese is only 3% and therefore the droplets of manganese are much less numerous.

Analogous results are obtained by making use of a single cementation product in which iodine and ammonium fluoride are mixed together.

When iodine alone is used, the scouring of the surface is imperfect, the joining of the pieces is not so good and their surface is dull.

Similar qualitative results are obtained by using, instead of a silver-manganese solder, a nickel-chromium-silicon-boron solder.

Equivalent results are obtained when iodine is replaced by bromine, this bromine being advantageously supplied in the form of magnesium bromide. It should be noted that the effects of bromine are intermediate between those of fluorine and of iodine.

It should be pointed out with reference to the treatment box shown by FIG. 3 that the gas circulating in container 4 around said box is ammonia fed from conduit 5 or formed in situ.

As hard solders I may use the conventional materials (the use of a flux being unnecessary) such as copper, copper alloys, silver-palladium, silver-manganese, possibly nickel-chromium with some special precautions, these materials being possibly mixed with a slight amount of silicon, boron, etc . . .

In the case of a solder which contains manganese, some modification of the composition of the solder may occur, due to the loss of a portion of this manganese in the form of relatively volatile manganese fluoride. In order to avoid this drawback, I may add manganese fluoride or manganese powder to the cementation product. I may even, preferably, make use of a cementation product containing a mixture of halides one of which is a fluoride, as above indicated. In this way I have been able to obtain a very good brazing between pieces of highly refractory materials such as molybdenum and tungsten (either previously chromized or not), the hard solder that is used being then, according to the needs, either a conventional solder, or an alloy of chromium such as stainless steel (Cr 18%, Ni 8%), a "Nimonic" or a "Hastelloy."

I have also been able to braze molybdenum on iron or chromized iron, the operation being effected in iron boxes, the whole being advantageously heated in a high frequency oven at a temperature ranging from 1200 to 1450° C.

When the treatment temperature is above 1200 or 1250° C., it is advantageous to place the cementation product 2 in a portion of the treatment box kept at a lower temperature, in order to avoid too great an evaporation of chromium fluoride.

Very good results have also been obtained when brazing pieces consisting chiefly of hard metallic carbides (chromium carbide in particular), especially on pieces made of chromium alloys (either ferrous or not). In this case, it is possible that the junction of the carbide piece with the other piece is not ensured by an intermetallic diffusion alloy as in the case of brazing of metallic pieces together. But this junction is however very strong and comparable to that obtained by such a diffusion. Possibly this junction is ensured by a penetration of the brazing solder into the layer of carbide crystals.

The method according to my invention makes it possible to obtain, in very good conditions, "sandwich materials" consisting of sheets of chromium alloys brazed against a sheet of a material having a high thermal conductivity.

For instance I have obtained elements, for instance for combustion chambers, which are capable of resisting very high temperature and of withstanding violent thermal shocks by making use of sheets of "Nimonic 75" brazed to a copper sheet forming the inner portion of the material (the solder consisting advantageously of silver), the treatment being conducted at a temperature averaging 1000° C., lower than the melting point of copper and higher than the melting point of silver.

It has been stated above that the regeneration chromium and also the chromium present in the cementation product are generally out of contact with the pieces to be treated, in such manner as to prevent any substantial chromizing of the pieces.

When it is desired to braze sandwich materials of this kind in purely gaseous atmosphere it is of interest, in order to have a good application of the surfaces to be brazed against one another, to operate at temperatures higher than the melting temperature of the solder and which are also relatively close to the melting point of the most fusible metal of the two sheets. For instance, when it is desired to braze "Nimonic 75" and copper, the solder consisting of an electrolytic deposit of silver of a thickness of some twenty microns formed on the copper sheet, it is advisable to adopt, for brazing, temperatures ranging from 900° C. to 1050° C., whereas the melting point of copper is 1083° C., so that copper, without melting, is close to its melting point.

I will now give some examples of the brazing method according to my invention.

*Example I*

This example is concerned with the brazing of rods of 25/20 chromium-nickel steel in hollow blades of "Nimonic 75." The solder that is used is a silver-palladium solder melting at 1120° C.

The pieces to be brazed together are heated for 20 minutes at a temperature of 1150° C. in partly gastight iron boxes at the bottom of which is provided a small amount of a cementation product constituted by a mixture of chromium powder and of acid or neutral ammonium fluoride in aqueous solution (about 5 g. of chromium and 2 g. of fluoride per useful liter), a small amount of chromium in the form of grains being on the other hand disposed on a grid in the vicinity of the lid of the boxes, and consequently sufficiently far from the pieces to be brazed together to avoid any substantial addition of chromium to said pieces.

Several of these treatment boxes are superimposed on the inside of a furnace muffle of refractory alloy in which there is maintained, after evacuation of the gases during the heating up period, a small overpressure of hydrogen or ammonia.

After the treatment boxes have been withdrawn from the oven and after cooling, the pieces obtained have a uniformly bright appearance and are perfectly well brazed together. Micrographic examination of a cut made in the pieces shows that the assembly by brazing is perfectly continuous and that there are no traces of oxygen therein.

*Example II*

This example is concerned with the brazing of combustion chamber elements made of "Nimonic 75" on supports also made of "Nimonic 75." The solder that is used is a nickel-chromium-boron-silicon solder.

The pieces are brazed in conditions similar to those of the preceding example, but at a higher temperature (from 1175 to 1200° C.), but the cementation product does not contain water but a mixture of acid or neutral ammonium fluoride and magnesium bromide in equal amounts and the proportion of ammonium fluoride in the cementation product corresponds to 1.5 g. per useful liter, in order to prevent too great a loss of silicon from the solder. The cementation mixture further contains chromium powder.

The pieces that are obtained are perfectly brazed together and uniformly bright, although there is no chromizing.

*Example III*

This example is concerned with the production of sandwich sheets of "Nimonic 75," copper and "Nimonic 75," the central sheet being the copper sheet.

I place between two sheets of "Nimonic 75," 1 mm. thick, a plate of copper also 1 mm. thick, both faces of which are covered with an electrolytic deposit of silver and which has been dipped in a solution of acid or neutral ammonium fluoride, then dried.

The whole is heated in a partly gastight box located in a reducing atmosphere (hydrogen or argon mixed with hydrogen).

At the bottom of the treatment box, there is placed one or several cementation products constituted by a mixture of nickel powder, chromium powder and acid or neutral ammonium fluoride (3 g. of this cementation product per useful liter) to which there may be added a small amount of a solution of ammonium carbonate.

No complementary chromium in the form of grains is provided and the treatment does not produce a chromizing of the external sheets.

The treatment boxes are heated for 45 minutes at a temperature ranging from 1000 to 1020° C. and, after cooling of the boxes, I obtain sandwich sheets of uniformly bright appearance the outer elements of which are perfectly well joined by brazing and diffusion as can be shown by micrographic examination of sections thereof. Such materials can be deformed in the cold state or stamped without any separation between the elements. They resist also to violent thermal shocks, for instance quenching in water after heating at 1150° C.

*Example IV*

This example is concerned with the brazing of stamped pieces of 25/20 chromium-nickel steel with stamped pieces of copper fitting exactly against said first mentioned pieces. The solder is silver.

The conditions of operation are analogous to those of the preceding example, the copper pieces being silvered only on their faces that are to come into contact with the pieces of 25/20 alloy.

According to a modification, a thin sheet of silver is interposed between the pieces to be brazed together. In this case, the pieces of refractory alloy or those of copper are preliminarily immersed in acid or neutral ammonium fluoride.

It is noted that there is no chromizing of the pieces.

*Example V*

This example is concerned with the brazing of molybdenum pieces. The solder that is used is a powder of 18/8 chromium-nickel steel.

The cementation product consists of a mixture of fluoride and chloride of chromium prepared in advance and mixed with a slight amount of ammonium fluoride (1 g. per liter).

The whole is heated to a temperature of 1375° C. in iron boxes.

There is no substantial addition of chromium to the pieces to be brazed together.

Example VI

This example is concerned with the brazing of plastic chromium pieces on supports of 80/20 nickel chromium alloy (Nimonic 75).

The chromium pieces that are used have been elaborated by machining of blocks of sintered plastic chromium powder in a halogen containing atmosphere. The plastic chromium powder has been obtained by halogenated treatment of a fine powder of electrolytic chromium. The sintering of the blocks of compressed plastic chromium powder is effected with a recompression taking place between two heatings at 1250° C. in a halogen containing atmosphere (heating in partly gastight boxes), the pieces being embedded in grains of chromium in the presence of acid ammonium fluoride (1 g./liter) and iodine (0.2 g./liter). The pieces of pure chromium thus obtained have a density equal to 6.84, the pieces being very slightly porous but not permeable to gases.

The solder that is used is a commercial silver-palladium-copper-nickel solder having a melting point ranging from 1050 to 1075° C.

The grains of chromium in which the pieces are embedded are intended to prevent the pieces, which are made of pure chromium, from being attacked by the hydrohalogenic acids present in the treatment atmosphere. Of course the presence of these chromium grains involves no addition of chromium to the pieces since these pieces are made of pure chromium.

The assemblies of pieces are heated in soft steel boxes provided with partly gastight lids and placed in a reducing hydrogen atmosphere.

At the bottom of the treatment box, and also in the vicinity of the lid thereof, there is placed a cementation product consisting of a mixture of ferrochromium grains, nickel powder, ammonium fluoride (2.5 g./liter) and iodine (0.5 g./liter).

The treatment boxes are heated for 30 minutes at 1100/1130° C.

At the end of the treatment, after cooling of the boxes, I obtain pieces which are perfectly well brazed together. The assemblies are of white-silver color. The mechanical resistance of the brazed area is about 60 kg./sq. mm. in the cold state.

When it is desired to avoid any risk of superficial nitriding of the pieces, the halogen or halogens may be supplied in the solid or liquid combined form, for instance $Br_3F$, ICl, IBr, etc. . . . the protecting atmosphere which surrounds the boxes being then preferably argon.

Example VII

This example relates to brazing of blades made of a refractory alloy on supports of 25/20 chromium nickel steel.

The refractory alloy that is referred to is a refractory chromium nickel steel containing 18% of chromium and 10% of nickel.

In this example, the blades must undergo a reheating at 1250/1275° C., which heating is effected during the brazing operation.

The solder that is used is a commercial cobalt-nickel-copper solder having a melting point of 1250° C.

The conditions of operation are analogous to those of the preceding example, but the pieces are not embedded in grains of chromium, there being no chromium grains in the box so that there can be no addition of chromium to the pieces. Furthermore, the cementation product consists of a mixture of cobalt powder, iron powder and acid ammonium fluoride (2.5 g./liter). The boiling point of cobalt fluoride is above 1300° C.

The treatment temperature is about 1275° C.

The pieces obtained after treatment are perfectly well brazed and show no trace of intergranular corrosion. The mechanical resistance of the brazed portion is about 50 kg./sq. mm.

Example VIII

This example relates to the brazing, on nickel-chromium "Nimonic 75" alloy envelopes, of sintered pieces consisting of a mixture of an alloy with a refractory oxide, in this case a mixture of 25/20 nickel-chromium steel with 25% of chromium oxide $Cr_2O_3$.

In the brazing operation above described for joining nickel chromium pieces with other pieces consisting of or containing nickel and chromium, the atmospheres that were used have a deoxidizing power so strong that if the sintered pieces (metallic powder and refractory oxide powder) are placed therein, the refractory oxides at the surface of the pieces are reduced and the surface of said sintered pieces which is purely metallic (in the present case nickel-chromium) brazes with the metal piece (nickel-chromium steel) in the same manner as in the preceding examples. For instance, the solder being copper and the conditions of treatment such as above indicated, the assemblies are uniformly bright and the brazings are perfectly strong.

Example IX

This example relates to the brazing, on supports made of an alloy of cobalt, chromium (20%) and tungsten (10%), of sintered pieces obtained from a mixture of 18/8 chromium nickel steel with beryllium oxide (15%).

The solder that is used is a silver-palladium solder having a melting point of 1150° C.

The atmosphere contains fluorine and iodine and it is obtained by placing the pieces in partly gastight treatment boxes containing a cementation product consisting of a cobalt powder, ammonium fluoride (2.5 g./liter) and iodine (0.5 g./liter).

The treatment is carried out at 1200° C. for 45 minutes.

Elimination of the refractory oxide (chromium oxide or beryllium oxide) from the surface of the pieces takes place in the brazing treatment boxes while the pieces are being heated up to the brazing temperature.

Example X

I disposed, upon Nimonic 80 plates, vertical tubes of different refractory alloys of various lengths tightly secured together by means of stainless steel collars. The length of the tubes ranged from 25 to 125 mm. Between the support plate and the tubes I disposed small plates of either a solder consisting of pure copper or of composite solders such as silver and copper or gold and copper solders.

The structure thus formed was heated, to a temperature about 20° higher than the melting point of the solder used, in a brazing atmosphere according to the present invention (heating in partly gastight boxes placed in a hydrogen atmosphere, a small amount of a mixture of chromium powder and acid ammonium fluoride being disposed on the bottoms of the boxes).

In all cases, the assemblies that were obtained were uniformly bright, the molten solder having run up to the maximum height, corresponding to the top of every tube, along the adjoining areas.

Example XI

This example relates to the brazing of a honeycombed structure made of 18/8 stainless steel on "Nimonic 75" envelopes.

The honeycombed structures previously assembled together, are brazed at 1100° C. on plates of "Nimonic 75."

The operation is effected with the use of a cementation product containing chromium powder and ammonium fluoride, a reserve of chromium in the form of grains being placed on a grid in the vicinity of the cover of the treatment boxes. These grains are only intended to retain the oxidizing gases from the outside if they happened to flow in through the partly fluidtight joint of the lid. They are sufficiently far from the pieces to avoid any substantial addition of chromium to the pieces. A slight pressure is applied to the assembly by means of graphite supports.

*Example XII*

This example relates to the assembly of elements of 18/8 chromium nickel steel by brazing to form a honeycombed structure and to the fixation of this honeycombed structure, also by brazing, on envelopes of a 18/8 steel alloy.

The elements of the honeycombed structure are merely placed on a sheet of 18/8 steel from which they are separated by a thin sheet of copper acting as solder. The honeycombed structure is kept in position under a slight pressure by means of graphite elements.

The whole is heated in partly gastight boxes at the bottom of which there is a cementation product consisting of ammonium fluoride and chromium powder. A slight complementary amount of acid or neutral ammonium fluoride is distributed in the honeycombed structure so as to evacuate, during the heating up period, the air it contains. The temperature for this operation ranges from 1100 to 1120° C. and its duration is about 30 minutes at this temperature.

After cooling of the treatment boxes, I obtain a honeycombed structure the elements of which are remarkably well assembled together (copper, after melting, has perfectly well wetted the areas to be assembled together and has climbed by capillarity to the upper part of the honeycombed structure). On the other hand, the honeycombed structure is very regularly brazed to the stainless steel envelope. The whole has a uniformly bright appearance, but there is no substantial addition of chromium to the pieces.

In Examples XI and XII the copper solder might be replaced by a silver or silver-palladium solder.

*Example XIII*

The assemblies to be brazed together consist of a honeycombed core made of 15-7-Mo steel surrounded by envelopes of the same material (thickness of the sheet constituting the core equal to 30 microns, thickness of the envelopes equal to 200 microns). The solder consists of sheets of an eutectic silver and copper alloy having a melting point of 780° C., disposed between the honeycombed core and the envelopes (thickness equal to 30 microns). The honeycombed core is not provided with auxiliary perforations and the evacuation of the air contained in the cells takes place merely by means of the decomposition products of the dissociable fluorides used in the method.

For this purpose, the honeycombed core is initially coated with a thin film of ammonium fluoride obtained by dipping it in an alcoholic water solution of ammonium fluoride, which may contain small amounts of chromium fluoride. Then this core is dried in an oven at about 120° C.

The structure thus obtained, which is given the desired shape either by means of graphite shaping means or by means of metallic shaping means, is placed in boxes provided with partly fluidtight lids on the bottoms of which has been placed a mixture of acid ammonium fluoride (2 grs. per useful liter in the box) and of chromium in the form of fine grains. The boxes are heated in a protective atmosphere of cracked ammonia up to a temperature of 850° C. and kept for half an hour at this temperature, after which they are cooled down. The structural hardening treatment of 15-7-Mo steel can take place either inside the boxes used for the brazing treatment or as a separate operation (that is to say cooling at a temperature ranging from 0° to 80° C., then hardening by heating at about 500° C.).

The honeycombed structure thus obtained has a uniformly bright appearance and is perfectly brazed, without any discontinuity between the honeycombed core and the outer envelopes. The cells of the honeycombed structure are fluidtight, due to the fact that the molten solder has run up along all the junction areas. The material thus obtained therefore has the best possible properties of mechanical strength and resistance to corrosion in service.

*Example XIV*

This example relates to the brazing together of "Nimonic 80" elements to form a honeycombed structure.

The conditions of preparation of the assemblies are analogous to those above described, and in particular no preliminary scouring of the refractory alloy elements is necessary despite the great sensitiveness of the material to superficial oxidation.

The conditions of operation are also analogous, but, according as the case may be, I make use of sheets of a solder consisting of silver and palladium (melting point 1050° C.) of gold, of gold and copper in the proportions of 80–20 (melting point 1000° C.) or of copper, the treatment temperatures ranging from 1050° to 1100° C. The cementation mixture placed in the partly gastight boxes consists of ammonium fluoride and a powder of cobalt or of ferro-nickel.

The brazed assemblies that are obtained are uniformly bright and have no porosity or leaks in the brazed areas. In most cases the whole of the areas of the honeycombed core is coated with a thin bright sheet of the metal which constitutes the solder, this sheet being conveyed by transportation in a halogenated gaseous phase.

In the same conditions I obtained composite honeycombed structure consisting for instance of a cellular core of 15-7-Mo refractory steel and of envelopes one of which is made of "Nimonic 80" and the other of molybdenum or tungsten. I may also produce, in the same conditions of treatment, analogous refractory materials having the cellular structure commonly called "undulated cardboard structure."

*Example XV*

This example relates to the assembly of elements of 18/8 chromium nickel steel in order to obtain a honeycombed structure.

It is known to assemble such elements, carried by graphite supports, together by brazing with a copper or silver-copper solder (use can also be made of silver or silver-palladium solder).

According to the invention, the atmosphere for the brazing operation is a reducing fluorine containing atmosphere corresponding to equilibrium of the reversible reaction of hydrogen with chromium fluoride. The cementation mixture comprises ammonium fluoride and chromium powder. Possibly, I may add a small amount of ICl or $I_3$Cl. No particular precaution is necessary, the air initially contained in the treatment chambers being swept away merely under the action of the gases produced by dissociation of ammonium fluoride. The treatment chambers may, as in all the other examples above cited, be used a great number of times without any scouring being necessary.

By treatment at a temperature ranging from 850 to 1150° C., I obtain materials which are very regularly assembled together, the appearance of the assembled pieces being uniformly bright although there is no substantial addition of chromium on the pieces.

It may happen that, in these conditions, the graphite supports are superficially chromized.

Not only have I discovered this surprising fact that a layer of chromium carbide can be formed on graphite parts, even when there is no substantial addition of chromium on the metal pieces supported by said graphite parts but also that this layer of chromium carbide is perfectly wetted by the excess of solder dipping from the pieces to be brazed together. The experiments that have followed this discovery showed that it is possible, to form, in a reproducible manner, layers of chromium carbide intimately bound to the underlying graphite (or diamond, or coke) and that it is possible to form such layers by means of the hydrogen and halogen containing atmosphere in the box, according to the invention, whether or not in conditions such that chromium halide (fluoride) produces a substantial diffusion of chromium into the metal pieces. But it is more advantageous to treat graphite when there is a substantial depositing of chromium on the metal pieces. Therefore all the methods that are known for the chromizing of metal pieces can be used for the formation of a layer of chromium carbide on a graphite piece, although this formation may be obtained also through other methods.

FIGS. 4 to 9 inclusive show that the brazing solder does not produce a diffusion alloy properly so called but that there is a penetration of this brazing solder into the interstices between the chromium carbide crystals which results in a binding between the brazing solder and the chromium carbide layer quite comparable to that produced by the formation of a diffusion alloy.

The treatment permitting of obtaining a layer of chromium carbide on a piece of graphite is, for instance, as follows:

The graphite pieces are heated in a cementation mixture having, for instance, the following composition:

Magnesothermic chromium, 60%,
Alumina or magnesia acting as a diluting substance 40%.

Between treatments about 1% of ammonium chloride or bromide (or of halogens such IBr, ICl$_3$, if it is desired to avoid the presence of chromium nitrides in the chromized layers) is added.

The whole is placed in a steel box, provided with partly fluidtight lid, which is heated, at a temperature of at least about 800° C., in an oven containing a protecting atmosphere, such as hydrogen, argon or ammonia, then cooled down on the outside of said oven.

After treatment, the graphite pieces are separated from the cementation mixture, which is stored up in fluidtight vessels, to be used for subsequent treatment.

The treatment may also be carried out by heating the pieces in chromium in the form of grains in the presence of small amounts of ammonium fluoride or chromium fluoride. An inert refractory diluting substance may be added to avoid a parasitic diffusion of carbon into chromium, which diffusion may take place when the treatment is performed at temperatures above 950° C.

In the case where chromizing must be limited to only a portion of the surfaces of the treated articles, I may proceed in two different manners:

(1) The pieces are heated in a normal chromizing mixture, with metallic envelopes of steel, nickel, etc., or electrolytic linings, such as copper linings locally protecting the desired areas against the addition of chromium.

(2) The pieces are heated in a halogen containing reducing atmosphere, in particular produced by the decomposition of ammonium fluoride and chromium in the state of a fine powder or chromium halides in the form of aqueous suspensions being disposed over the areas to be chromized. I may also dispose in proximity of the areas which are to be chromized, metal envelopes that have been electrolytically chromium-plated or have been chromized.

As it will be hereinafter described, chromizing of graphite articles may be included in a treatment such as the brazing of said articles or the coating thereof with molten metallic deposits.

FIG. 4 is a micrography showing with a magnification of 500 the cross section of a chromized graphite piece.

The graphite piece is shown in dark and the chromium carbide layer formed thereon in white. The chromium carbide layer is anchored to the graphite piece by projections formed in the graphite mass which have penetrated into the recesses between the graphite crystals. Some of these recesses are shown as connected with the chromium carbide layer, others seem to be unconnected therewith but the connections exist, being not visible because they are not intersected by the cross section plane.

Graphite or analogous carbon grains can be chromized so as to obtain dynamically free powders of chromium carbides or carbonitrides. This operation may be effected by heating, in partly fluidtight boxes placed in a protective atmosphere, an intimate mixture comprising the powders to be choromized, chromium supplied in dosed amounts in a very fine form, a soluble refractory diluting substance, such as magnesia, and the halogenated conveyer (ammonium chloride or ammonium bromide).

An example of the reactive mass that is used is as follows:

Graphite in the form of flakes: 50% by weight;
Magnesothermic half-product (chromium+magnesia) containing 30% of chromium: 50% by weight, with the addition of about 1% of ammonium bromide.

The whole, in the form of an intimate mixture, is placed in partly fluidtight steel boxes, having chromized inner walls which are heated for two hours at 925° C.

After chromization, the chromized powder is separated so as to eliminate magnesia and the chromium halide, together with the possible amount of chromium that has remained, by washing in hydrofluoric acid diluted in water and drying.

The treatment may be applied in the same conditions to the coating of graphite fibers or graphite clothes, or for the coating of diamond grains preliminary to the use of the grains thus treated to the brazing thereof on a metallic support.

The most direct application of graphite chromization seems to be the protection against oxidizing, layers of chromium carbides resisting to oxidizing up to temperatures above 1000° C.

However, the protective layers that are formed are very thin and liable to be scratched and in view of the low mechanical characteristics of graphite, any scratch leads to a quick destruction of the piece subjected to oxidizing at high temperature, this piece being hollowed out so that only the chromized coating layer remains.

Chromized layers formed on graphite have, on the contrary, a particular interest due to their aptitude to wetting by molten materials, and therefore to brazing and also to their aptitude to the direct enamelling of such layers.

The use of hydrogen and halogen atmospheres and in particular of hydrogen and fluorine reducing atmospheres, obtained merely by placing ammonium fluoride (and an additional amount of chromium grains in the case of a chromizing treatment) in partly fluidtight vessels heated in a protective atmosphere permits of obtaining a perfect wetting of chromized graphite pieces with molten metals such as silver, copper, gold, silver and copper alloys, silver and palladium alloys, gold and copper alloys, etc. The graphite pieces may be chromized either locally or over their whole surface.

In the areas which are not chromized, the molten metals do not wet the pieces and therefore either take the form of droplets or flow down.

It is possible to include the graphite chromizing treatment of the graphite piece over the areas to be coated into the elementary metal melting operation in a halogenated atmosphere by preliminarily forming a thin deposit of electrolytic chromium on the lining metals (thickness of chromium deposit equal to some microns).

In these conditions, and in particular when leaving the temperature constant for some time at a value within the range extending from 800° C. to 900° C., the chromium initially deposited on the metal intended to be secured to the graphite during the melting treatment, deposits along the areas of the graphite articles positioned in close proximity, by being conveyed through a halogenated gaseous medium. At the melting temperature of the lining metal, the latter then wets perfectly well the areas that have been thus chromized.

It is thus possible to melt in a halogenated atmosphere plates of copper chromized on their faces of assembly, on graphite plates, or to melt chromized copper pellets in cups formed in graphite articles.

The graphite metallized by such melting may be subsequently joined to different metallic materials in the usual conditions (for instance, tin soldering of copper current inputs on graphite dynamo-brushes locally covered with copper by melting).

Figure 5:
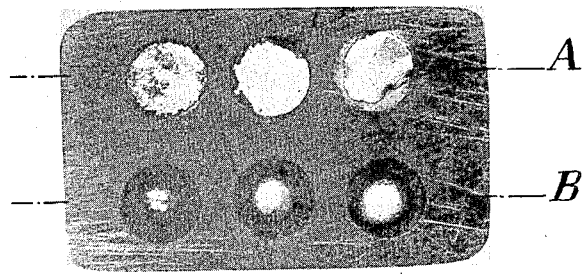
FIG. 5 is a microphotography illustrating the respective behaviours of different hard solders in cups formed in a piece of graphite.

FIG. 5 shows an experiment relative to the anchoring of different metals (brazing solders) on a piece of graphite.

This piece of graphite is in the form of a plate provided with two rows of recesses forming as many cups.

The bottom is illustrative of what happens when the whole is heated to a temperature such that the hard solder metals are molten directly in the cups. Said hard solder metals form drops in the cups and do not wet the surface thereof.

On the contrary, if, as was the case with the upper row, the lumps of solder metal were preliminarily chromium plated and if the whole is heated in an atmosphere containing hydrogen and vapors of halogenhydric acid, this acid forms, with the chromium present on the surface of the metals, chromium halide vapors which decompose on the surface of the graphite plate to form a chromium carbide layer which wets the graphite plate and on which is adhered the hard solder metal when the latter melts. This hard solder metal is thus spread on, and strongly adhered to, the surface of the cups formed in the graphite plate through the intermediate of the chromium carbide layer.

Of course the metals which constitute the hard solders must have a melting point higher than about 800° C., which is the temperature at which the layer of chromium carbide is formed.

Figure 6:
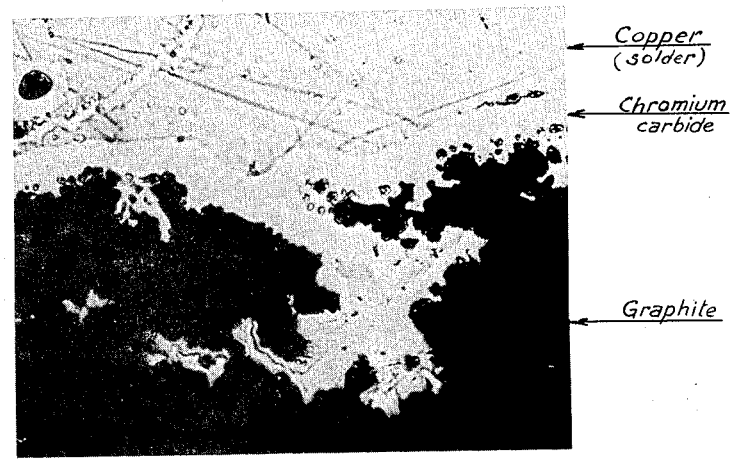
FIG. 6 is a microphotography illustrating how a copper hard solder is secured to a layer of chromium carbide itself anchored to a piece of graphite.

FIG. 6 shows the structure of the joining zone in the case of a chromized graphite piece coated with copper fixed thereon by melting. It may be seen on the one hand that there is no solution of continuity in the brazed zone and on the other hand that there is a local penetration, into the porosities of graphite, of chromium carbide and of the molten metal coating.

The magnification in this case is 1000.

I will now refer to the brazing in a hydrogen and halogen containing atmosphere of assemblies of graphite or of graphite on metals.

In view of the aptitude to wetting by molten metals of chromized graphite in a hydrogen and halogen containing atmosphere (that is to say containing hydrogen and a hydrohalogenic acid), the conditions above described permit of assembling together by brazing a piece of graphite with another piece of graphite or a piece of graphite with a metal piece and such assemblies having no discontinuity in the areas assembled by brazing.

Chromization of graphite may be performed either in a preliminary treatment (either a general chromization or a chromization localized to the areas of assembly) or be included in the brazing operation. In particular, I may use preliminarily chromized hard solders or proceed by coating with a suspension of chromium halide the areas of the graphite articles which are to be joined by brazing.

In particular it is possible to make sandwich materials of graphite and molybdenum, graphite and chromized tungsten, or graphite and chromized molybdenum comprising the desired number of superposed sheets, by performing the brazing of these materials through the chromium carbide layer in the hydrogen and hydrohalogenic acid containing atmospheres above referred to.

Figure 7:
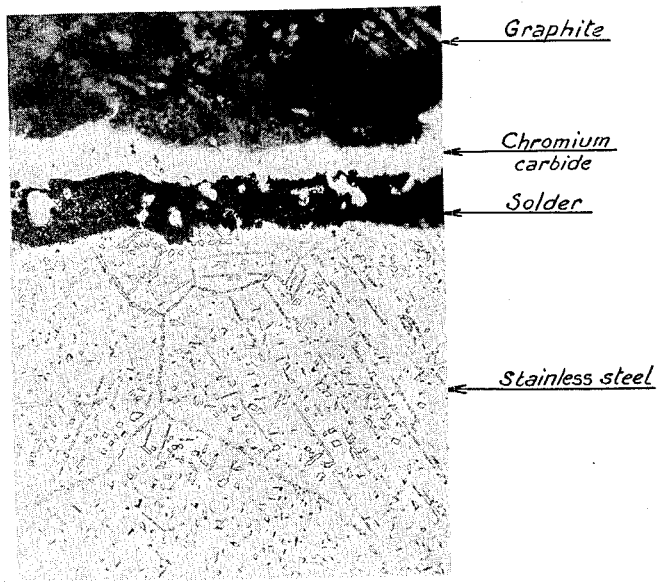
FIG. 7 is a microphotography illustrating the brazing of a piece of stainless steel on a layer of chromium carbide itself anchored on a piece of graphite.

FIG. 7 shows the structure of the joining zone in the case of a piece of stainless steel joined to a piece of graphite through a layer of chromium carbide, the hard solder consisting of a silver-palladium alloy. The magnification is 500.

Figure 8:
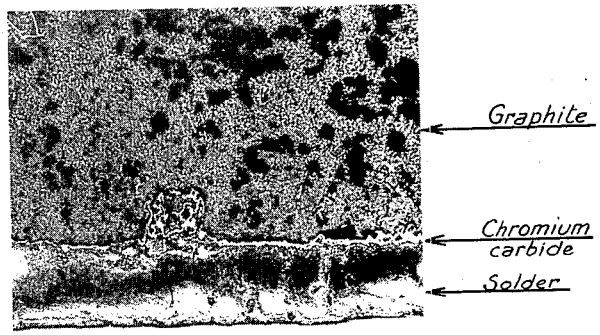
FIG. 8 is a similar view but in which stainless steel is replaced by tungsten.

FIG. 8 is a similar view in the case where the metal is tungsten and the hard solder is copper. The magnification is 150.

It will be noted that the thickness of the chromium carbide layer is smaller in the case of FIG. 8.

The coating of graphite articles to form thereon a continuous layer of susbtantial thickness of a metal having a high melting point can also be obtained by electrolytically forming a composite structure consisting of superposed deposits of said high melting point metal and of a metal fusible at the temperature of treatment and of a complementary metal compatible with said first metal, after which the composite structure thus obtained is brazed, through the face thereof formed of the metal of lower melting point, on the graphite article through the chromium carbide layer formed thereon.

In a different manner I may also coat, either locally or on the whole surface thereof, the graphite article lined with a layer of chromium carbide with an envelope of a metal having a high melting point, such as nickel by first effecting a thin deposit of a metal such as copper, gold, silver or the like, then a deposit of the metal having a higher melting point (nickel), the whole being then placed in an oven, in a hydrohalogenic and hydrogen atmosphere, and heated to a temperature higher than the melting point of the metal of lower melting point (copper) which acts as a hard solder.

Chromized graphite surfaces have a special aptitude to being enamelled directly, that is to say without an intermediate support, same as metallic materials coated with chromium by diffusion.

Figure 9:
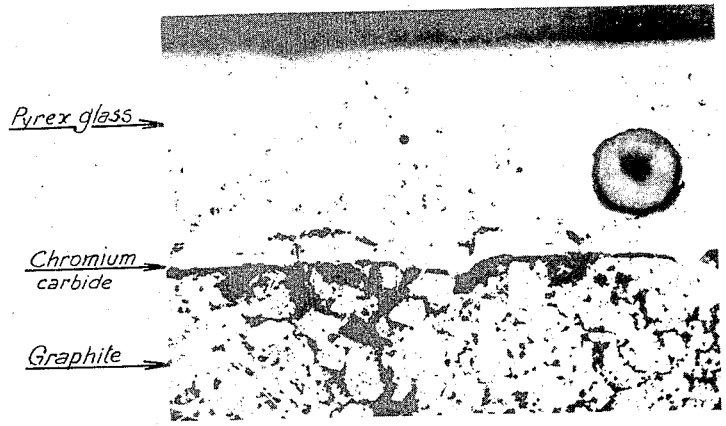
FIG. 9 is a microphotography illustrating the anchoring of a piece of glass on a layer of chromium carbide itself anchored on a piece of graphite.

FIG. 9 shows, with a magnification equal to 150, the structure of the binding zone in the case of a chromized graphite piece coated, by melting, with Pyrex glass.

To sum up, carbon under its various allotropic forms, and also hard carbides, subjected to the action of chromium halide vapors is coated with perfectly adhesive thin layers consisting chiefly of chromium carbides. The superficial layers of chromium carbides may be formed in an operation which precedes brazing but they are preferably formed during the brazing treatment. It suffices in this case either of utilizing solders coated with a thin deposit of chromium, for instance electrolytic chromium, or of utilizing chromium containing solders. During the treatment in an atmosphere of hydrogen and hydrohalogenic acid, the chromium of the solders is conveyed in gaseous phase to the adjoining areas of the piece the main body of which consists of carbon or contains carbon (hard carbides), thus giving said piece the aptitude to brazing in the above mentioned atmosphere.

I will now give examples of such methods:

*Example XVI*

On plates of graphite it is desired to braze structures enveloped in a perfectly continuous manner in a molybdenum coating.

Between the graphite plates and the molybdenum enveloped structures I place sheets of copper or gold chromized on one side thereof which is the face in contact with the graphite pieces (thickness of the chromium deposit equal to 10 microns). The pieces are heated in partly fluidtight boxes placed in a hydrogen containing atmosphere, in the presence of chromium powder and of acid ammonium fluoride, at a temperature higher by 30° than the melting temperature of the solders that are used.

The assemblies obtained after the brazing treatment are continuous along the brazed areas. Metallographic examination of a section permits of seeing the thin film of chromium carbide diffused on the surface of the graphite plates, this carbide film having ensured a perfect wetting during the treatment.

Example XVII

This example relates to the brazing of two graphite structures together.

The conditions of treatment are analogous to those stated in the preceding example, but the solder sheets are chromized on both of their faces so as to permit the formation of a chromium carbide film on the surface of each of the graphite pieces. In order to avoid a chromizing, not desired in this case, of the graphite plate along areas other than the surfaces which are to be connected together by brazing, the reaction mixture placed in the treatment boxes consists of a mixture of cobalt powder and ammonium fluoride. In this case, the active atmosphere which is formed at high temperature is a mixture of hydrofluoric acid and hydrogen in the state of equilibrium of reduction of the cobalt fluoride for the temperature of treatment that is applied.

Example XVIII

According to a modification used for an analogous purpose, I employ a reactive mixture consisting essentially of chromium and ammonium fluoride, but the assemblies to be brazed together are disposed in partly fluidtight auxiliary boxes themselves placed in the main treatment box, a small additional amount of ammonium fluoride, initially placed in said auxiliary boxes, permits of eliminating, during the heating up treatment, the air contained therein. The active non-oxidizing fluoride atmosphere in the balanced state is formed automatically in the main box. In such conditions the atmosphere existing at high temperature in the auxiliary treatment boxes is practically free from chromium fluoride. In all cases, the areas assembled together by brazing with the use of such treatment atmospheres have no solution of continuity and no porosity.

Metallographic examination of cross sections of the areas assembled by brazing shows the presence of a thin film of chromium carbides, which film is fixed to the material by diffusion and permits of obtaining an excellent wetting.

Example XIX

It relates to the brazing of small grains of diamonds on discs of stainless steel.

According as the case may be, I use either preliminary chromized diamond grains (heating in a reactive mixture containing chromium in the form of a very fine powder, a refractory diluting substance and a halogen containing conveyor such as ammonium fluoride for one hour at 875° C.) or grains which have not been preliminarily chromized, the solders that are used in this last case containing chromium or, preferably, consisting of thin sheets of the brazing materials electrolytically chromium plated along the face in contact with the diamond grains.

Every diamond grain is thus coated with a thin film of chromium carbide which ensures a perfect connection with the molten brazing solder.

Example XX

This example relates to the brazing of copper electric terminals on graphite elements of dynamos.

In blind holes of a diameter equal to 6 mm., corresponding to the current outputs for the dynamo brushes, I melt, by means of non-chromizing hydrogen and halogenic acid deoxidizing atmospheres such as above described (treatment of the pieces in nickel auxiliary boxes containing no chromium) copper pellets of 5 mm. diameter and 1 mm. thick coated, on the surfaces thereof in contact with the graphite, with an electrolytic deposit of chromium 10 microns thick.

The treatment is intended to ensure a perfect wetting on the molten copper over the areas located in the vicinity of the chromium plated copper pellets while avoiding a general chromizing of the areas, which chromizing might lead to an increase of the wear and tear of the dynamo-brushes.

After treatment, performed at 1120° C., the blind holes of the dynamo-brushes are coated with a copper deposit which is perfectly adhesive owing to the provision of the chromization film localized in the brazing area. The remainder of the surfaces of the dynamo-brushes has a semi-bright black superficial appearance and is not chromized at all.

Current output conduits of copper may be subsequently brazed on the copper coated areas through the usual methods of brazing in an ordinary atmosphere. When tests for conductors thus brazed are performed, breaking never takes place in the brazing area but in the subjacent graphite layers.

Example XXI

It relates to the brazing of thermo-electric couples lined with a stainless steel envelope in recesses formed in graphite bars.

It is desired to braze in a continuous manner a great number of thermo-electric couples in small recesses provided in graphite bars. The thermo-electric couples are wires coated in a flexible envelope of stainless steel from which they are insulated by magnesia so that the problem to be solved corresponds to that of brazing small tubes made of a chromium alloy on graphite bars.

On the bottom of each of the notches in which a thermo-electric couple is to be brazed I place a small pellet of gold chromized over the area which is to be brazed on the graphite area (the pellets have been obtained by cutting from a gold sheet chromized on one side thereof, the thickness of the chromium deposit being 10 microns).

The brazing treatment is then performed for half an hour at 1080° C. in a non-chromizing hydrogen and hydrohalogenic acid deoxidizing atmosphere under balanced reaction conditions (presence in the treatment boxes, heated in a hydrogen atmosphere, of a mixture of nickel powder and ammonium fluoride and chloride at the rate of 3 gr. per liter): After the brazing treatment, the sheaths of the thermo-couples are intimately secured to the graphite surfaces through the molten solder, which has perfectly wetted the graphite surfaces which are chromized only in the vicinity of the chromium plated solder pellets.

I will now give a further example of my invention relating to brazed assemblies at least a portion of which consists of hard carbides.

The hard carbides that are considered are chiefly those which are not substantially attacked when they are subjected to the action of the non-oxidizing hydrogen and hydrohalogenic acid atmospheres described in the present application. I may cite in particular chromium carbide, molybdenum carbide, tungsten carbide (with or without the addition of metallic binders) with the exclusion of carbides unstable in a halogenated atmosphere such as silicon carbide.

Example XXII

This example is concerned with the brazing of pieces of sintered chromium carbide with supports made of 18/8 chromium-nickel steel. The solder that is used is copper, melting at 1080° C.

The pieces to be brazed together are heated for twenty minutes at a temperature of 1100° C. in partly gastight iron boxes at the bottom of which is placed a small amount of a cementation product consisting of a mixture of acid or neutral ammonium fluoride and magnesium bromide, in equal amounts and in the proportion of 3 g. per useful liter, this mixture further containing a chromium powder. Any substantial addition of chromium to the pieces is avoided.

Several of those treatment boxes are superimposed on the inside of a furnace muffle made of a refractory alloy in which there is maintained, after evacuation of the gases during the heating up period, a small overpressure of hydrogen or ammonia.

What I claim is:

1. A method of joining together two pieces of respective materials selected from the group consisting of metals, alloys of metals, sintered mixtures of at least one metal and at least one refractory oxide, and metal carbides, by means of a hard solder capable, in the fused state, of joining said material pieces together, at least a portion of the surface of said solder containing at least ten percent of chromium, which method comprises juxtaposing said pieces in the relative position in which they are to be joined placing said solder along the adjoining portions of said material pieces, and heating the whole to a temperature higher than 700° C. in an atmosphere consisting essentially of hydrogen, hydrofluoric acid and a metallic fluoride which is little volatile and partly unstable in a hydrogen containing atmosphere, under conditions corresponding to a balanced reduction of the fluoride by the hydrogen.

2. A method of joining together two pieces one of which is metallic and at least a portion of the surface of which contains at least 10 percent of chromium and the other of which is made of a material selected from the group consisting of metals, alloys of metals, sintered mixtures of at least one metal and at least one refractory oxide, and metal carbides, by means of a hard solder capable, in the fused state, of joining said material pieces together, which method comprises juxtaposing said pieces in the relative position in which they are to be joined, placing said solder along the adjoining portions of said material pieces, and heating the whole to a temperature higher than 700° C. in an atmosphere consisting essentially of hydrogen, hydrofluoric acid and a metallic fluoride which is little volatile and partly unstable in a hydrogen containing atmosphere, under conditions corresponding to a balanced reduction of the fluoride by the hydrogen.

3. A method of joining together two pieces one of which is at least one metal of the group consisting of molybdenum and tungsten and the other of which is made of a material selected from the group consisting of metals, alloys of metals, sintered mixtures of at least one metal and at least one refractory oxide, and metal carbides, by means of a hard solder capable, in the fused state, of joining said material pieces together, which method comprises juxtaposing said pieces in the relative position in which they are to be joined, placing said solder along the adjoining portions of said material pieces, and heating the whole to a temperature higher than 700° C. in an atmosphere consisting essentially of hydrogen, hydrofluoric acid and a metallic fluoride which is little volatile and partly unstable in a hydrogen atmosphere under conditions corresponding to a balanced reduction of the fluoride by the hydrogen.

4. A method of joining together two pieces one of which is a sintered mixture of at least one metal and at least one refractory oxide and the other of which is made of a material selected from the group consisting of metals, alloys of metals, sintered mixtures of at least one metal and at least one refractory oxide, and metal carbides, by means of a hard solder capable, in the fused state, of joining said material pieces together, which method comprises juxtaposing said pieces in the relative position in which they are to be joined, placing said solder along the adjoining portions of said material pieces, and heating the whole to a temperature higher than 700° C. in an atmosphere consisting essentially of hydrogen, hydrofluoric acid and a metallic fluoride which is little volatile and partly unstable in a hydrogen containing atmosphere, under conditions corresponding to a balanced reduction of the fluoride by the hydrogen.

5. A method of joining together two pieces one of which is a hard metal carbide and the other of which is made of a material selected from the group consisting of metals, alloys of metals, sintered mixtures of at least one metal and at least one refractory oxide, and metal carbides, by means of a hard solder capable, in the fused state, of joining said material pieces together, which method comprises juxtaposing said pieces in the relative position in which they are to be joined, placing said solder along the adjoining portions of said material pieces, and heating the whole to a temperature higher than 700° C. in an atmosphere consisting essentially of hydrogen, hydrofluoric acid and a metallic fluoride which is little volatile and partly unstable in a hydrogen containing atmosphere, under conditions corresponding to a balanced reduction of the halide by the hydrogen.

References Cited by the Examiner

UNITED STATES PATENTS

| | | | |
|---|---|---|---|
| 2,561,565 | 7/1951 | Edson et al. | 29—494 |
| 2,561,566 | 7/1951 | Edson et al. | 29—494 |
| 2,570,248 | 10/1951 | Kelly | 29—472.7 |
| 2,801,187 | 7/1957 | Galmiche | 117—50 |
| 2,875,090 | 7/1959 | Galmiche | 117—50 |
| 3,119,171 | 1/1964 | Anderson | 29—472.7 |

JOHN F. CAMPBELL, *Primary Examiner.*